US008180773B2

(12) United States Patent
Chitiveli et al.

(10) Patent No.: US 8,180,773 B2
(45) Date of Patent: May 15, 2012

(54) DETECTING DUPLICATE DOCUMENTS USING CLASSIFICATION

(75) Inventors: Srinivas V. Chitiveli, Germantown, MD (US); Barton W. Emanuel, Manassas, VA (US); Alexander W. Holt, New Paltz, NY (US); Michael E. Moran, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/472,758

(22) Filed: May 27, 2009

(65) Prior Publication Data

US 2010/0306204 A1     Dec. 2, 2010

(51) Int. Cl.
*G06F 7/00*      (2006.01)
*G06F 17/30*     (2006.01)

(52) U.S. Cl. ........................................ 707/737
(58) Field of Classification Search ............ 707/752, 707/999.102, 737
See application file for complete search history.

(56) References Cited

U.S. PATENT DOCUMENTS

| 6,424,971 | B1 |   | 7/2002 | Kreulen et al. |
| 6,658,423 | B1 | * | 12/2003 | Pugh et al. .............................. 1/1 |
| 7,287,019 | B2 |   | 10/2007 | Kapoor et al. |
| 7,734,627 | B1 | * | 6/2010 | Tong ............................... 707/737 |
| 7,930,306 | B2 | * | 4/2011 | Scholtes et al. ................ 707/750 |
| 7,945,600 | B1 | * | 5/2011 | Thomas et al. ................. 707/804 |
| 2005/0060643 | A1 |   | 3/2005 | Glass et al. |
| 2008/0044016 | A1 | * | 2/2008 | Henzinger ...................... 380/201 |
| 2008/0065630 | A1 | * | 3/2008 | Luo et al. ............................ 707/6 |
| 2008/0205772 | A1 | * | 8/2008 | Blose et al. ..................... 382/225 |
| 2009/0028441 | A1 | * | 1/2009 | Milo et al. ....................... 382/218 |
| 2009/0220166 | A1 | * | 9/2009 | Choi et al. ....................... 382/260 |
| 2010/0150453 | A1 | * | 6/2010 | Ravid et al. .................... 382/218 |

FOREIGN PATENT DOCUMENTS

| JP | 10289246 A | 10/1998 |
| JP | 2005316699 A | 11/2005 |

* cited by examiner

*Primary Examiner* — Kimberly Lovel
(74) *Attorney, Agent, or Firm* — Patterson & Sheridan, LLP (57) ABSTRACT

Systems, methods and articles of manufacture are disclosed for detecting a duplicate document. A plurality of documents may be assigned to categories, each category corresponding to a collection of duplicates, or near duplicate documents. A new document may be received. The new document may be evaluated against each category to determine a similarity score between the new document and each category. The new document may be identified as a duplicate based on the similarity scores and thresholds for each category. An action may then be performed on the duplicate based on duplication rules. The thresholds and duplication rules may be customized by a user.

21 Claims, 6 Drawing Sheets

DETECTING DUPLICATE DOCUMENTS USING CLASSIFICATION

BACKGROUND OF THE INVENTION

1. Field of the Invention

Embodiments of the invention relate to managing files. More specifically, the field of the invention relates to detecting duplicate documents using classification.

2. Description of the Related Art

Many applications today manage files. For example, file systems, web sites, and content repositories are often used manage files. The files may include documents that are exact duplicates of one another. The files may also include documents that, while not being exact copies, are near duplicates of one another. When searching or managing files, it may be useful to identify duplicates and near-duplicates. When searching, it may be desirable to collapse a set of duplicates into a single result in a search results display. When managing content, it may be desirable to identify and eliminate duplicates from search results or from storage systems.

Some systems identify duplicates using metadata. For example, some systems may use metadata such as document title, document size, and document creation date, etc. (or some combination thereof) to identify duplicates. Other systems identify duplicates using hash algorithms. For example, some systems may use hash algorithms (e.g., Message-Digest algorithm 5 (MD5) or Secure Hash Algorithm (SHA)) to generate signatures of documents. The generated signatures may be then used to identify duplicates. Of course, when using a hash algorithm such as MD5 or SHA-1 even a single-bit difference in the binary representation of a document will result in non-identical hash values for that document. Thus, hash algorithms are ineffective for identifying whether two documents are near duplicates of one another.

SUMMARY OF THE INVENTION

One embodiment of the invention includes a computer-implemented method for managing a collection of documents. The method may generally include configuring one or more processors to perform an operation. The operation may generally include determining a similarity score between the received document and each of a plurality of categories, where each category is assigned one or more documents. The operation may also include determining, based on the plurality of similarity scores, whether the received document is one of a duplicate and a near-duplicate of one of the documents assigned to one of the plurality of categories. Upon determining that the received document is not a duplicate, or near duplicate, to a document assigned to any of the plurality of categories a new category may be created for the received document. Additionally, a classifier associated with the new category may be trained using the received document. The trained classifier is configured to determine a measure of similarity between the received document and an input document. Upon determining that the received document is a duplicate, or near duplicate, to a document assigned to at least one of the plurality of categories, the document is assigned to the determined category. Additionally, a classifier associated with the determined category may be trained using the received document.

Another embodiment of the invention includes a computer program product which includes a computer usable medium having computer usable program code for managing a collection of documents. The code may generally be configured for receiving a document and determining a similarity score between the received document and each of a plurality of categories. Each category is assigned one or more documents. The code may be further configured for determining, based on the plurality of similarity scores, whether the received document is one of a duplicate and a near-duplicate of one of the documents assigned to one of the plurality of categories. Upon determining that the received document is not a duplicate, or near duplicate, to a document assigned to any of the plurality of categories a new category may be created for the received document. Additionally, a classifier associated with the new category may be trained using the received document. The trained classifier is configured to determine a measure of similarity between the received document and an input document. Upon determining that the received document is a duplicate, or near duplicate, to a document assigned to at least one of the plurality of categories, the document is assigned to the determined category. Additionally, a classifier associated with the determined category may be trained using the received document.

Still another embodiment of the invention includes a system having a processor and a memory containing an application program configured to manage a collection of documents, which, when executed on the processor is configured to perform an operation. The operation may generally include determining a similarity score between the received document and each of a plurality of categories, where each category is assigned one or more documents. The operation may also include determining, based on the plurality of similarity scores, whether the received document is one of a duplicate and a near-duplicate of one of the documents assigned to one of the plurality of categories. Upon determining that the received document is not a duplicate, or near duplicate, to a document assigned to any of the plurality of categories a new category may be created for the received document. Additionally, a classifier associated with the new category may be trained using the received document. The trained classifier is configured to determine a measure of similarity between the received document and an input document. Upon determining that the received document is a duplicate, or near duplicate, to a document assigned to at least one of the plurality of categories, the document is assigned to the determined category. Additionally, a classifier associated with the determined category may be trained using the received document.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention may be used to determine whether two documents are duplicates or near duplicates of one another. One embodiment of the invention provides a duplicate detector. In one embodiment a statistical classification engine may be used to provide duplicate detection and near-duplicate identification. Each document, or group of near-duplicate documents, has a dedicated category generated by a classification engine. When a new document is identified, the contents of the document are sent to the classifier for scoring. If a high score is returned (e.g., a score that exceeds a user-specified threshold) relative to an existing category, the new document is considered to be a duplicate or near duplicate of a document represented by the existing category, otherwise the document has not been seen by the classification engine and is used to train a new category. A user may customize the thresholds and the duplication rules.

Thus, unlike systems that identify duplicates using hash algorithms, the duplicate detector may also identify near-duplicate documents and similar documents. Further, the duplicate detector may be less error-prone than systems that identify duplicates using document metadata.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
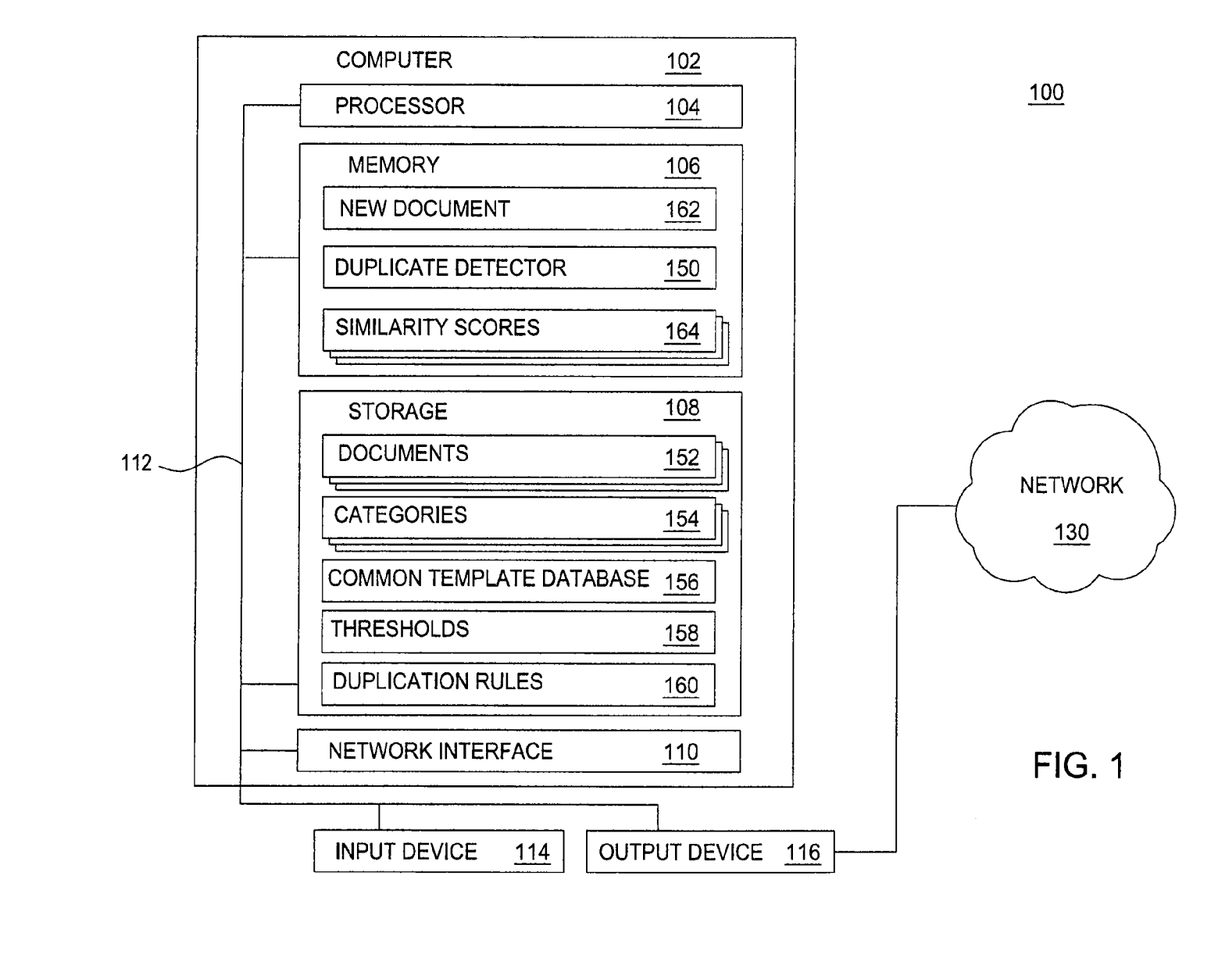
FIG. 1 is a block diagram illustrating a system for detecting duplicate documents using classification, according to one embodiment of the invention.

FIG. 1 is a block diagram illustrating a system 100 for detecting duplicate documents using classification, according to one embodiment of the invention. As shown, the system 100 includes a computer 102 that may be connected to other computers via a network 130. In general, the network 130 may be a telecommunications network and/or a wide area network (WAN). In a particular embodiment, the network 130 is the Internet.

As shown, the computer 102 includes a central processing unit (CPU) 104 connected to a memory 106, storage 108, a network interface device 110, and input device 114 and output devices 116 via a bus 112. CPU 104 is included to be representative of a single CPU, multiple CPUs, a single CPU having multiple processing cores, and the like. Storage 108 stores application programs and data for use by the computer system 102. The computer 102 may be connected to a data communications network 130 (e.g., a local area network, which itself may be connected to other networks such as the internet).

The computer 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips. The network interface device 110 may allow network communications between the computer 102 and other computers via the network 130. For example, the network interface device 110 may be a network adapter or other network interface card (N IC). The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used.

The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text-to-speech converter may be used.

As shown, the memory 106 of the computer 102 includes a new document 162 and a duplicate detector 150. Further, the storage 108 of the computer 102 includes documents 152, categories 154, a common template database 156, thresholds 158, and duplication rules 160. FIGS. 2 through 6 and associated descriptions detail the structure and operation of the duplicate detector 150 running on the computer 102.

Figure 2:
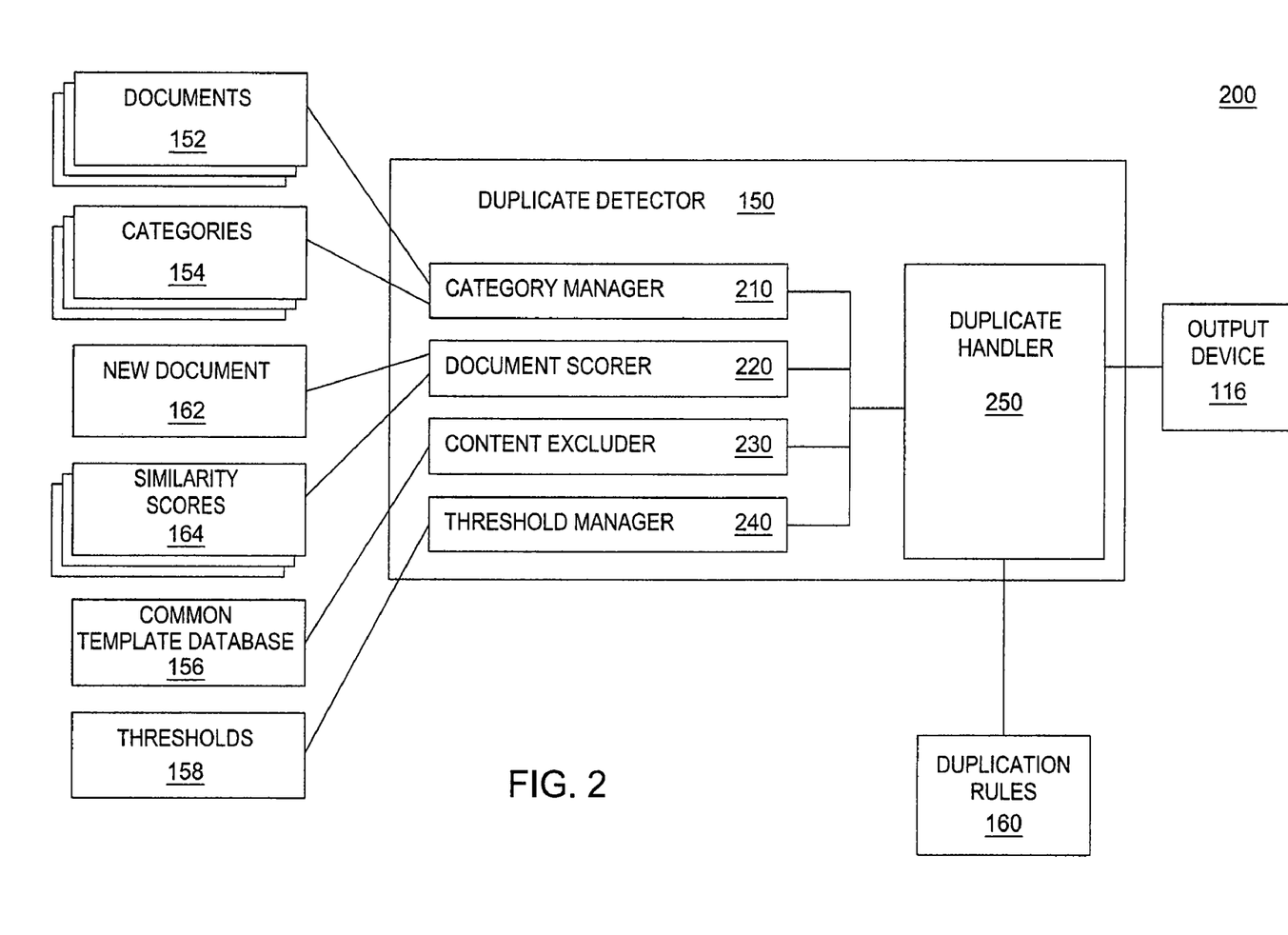
FIG. 2 is a block diagram illustrating components of a duplicate detector, according to one embodiment of the invention.

FIG. 2 is a block diagram 200 illustrating components of the duplicate detector 150 of FIG. 1, according to one embodiment of the invention. As shown, the duplicate detector 150 includes a category manager 210, a document scorer 220, a content excluder 230, a threshold manager 240, and a duplicate handler 250. In one embodiment, the duplicate detector 150 may be a statistical classifier. Other embodiments are broadly contemplated. For example, in another embodiment, the duplicate detector 150 may be a standalone application that works in conjunction with a statistical classifier. In such a case, the statistical classifier may perform certain functions of the duplicate detector 150 (such as the functions of the document scorer 220).

In one embodiment, the category manager 210 may evaluate a collection of documents to identify ones that are distinct from one another and ones that are near duplicates of one of the documents 152. Once classified by the document scorer 220, the category manager 210 may track which documents are distinct and which ones are near duplicates of one another. Thus, each category 154 managed by the category manager 210 may reference at least one document (i.e., one distinct document 152) and zero or more near-duplicates of that distinct document 152. In another embodiment, the category manager 210 may also create a new category for each near-duplicate document to improve accuracy in classifying documents. Each document 152 may be of any file type such as a web page, a word processor document, a spreadsheet, a presentation, etc. Table I illustrates an example of collection of documents:

TABLE I

Example Document Collection

| Distinct document | Content |
| --- | --- |
| Document D1 | A research paper |
| Document D2 | An internal memo |
| Document D3 | A client letter |
| Document D4 | A web-page version of D1 (i.e., a near duplicate) |

In this specific example, the documents in Table I include documents D1, D2, D3, and D4. In particular, D1 is a research paper, D2 is an internal memo, D3 is a client letter, and D4 is a web-page. Note, in this example, assume that D4 is a web-page version of D1—thus, the content of D4 is the same as D1, but D4 includes the HTML markup used by a web-browser to render D4.

To categorize these documents, the category manager 210 may create a taxonomy which includes categories 154. The categories 154 may include a category for each document classified as being distinct from all other documents then included in the taxonomy. Table II illustrates an example of categories 154 for the collection of documents in Table 1:

TABLE II

Categories example

| Documents | Category |
| --- | --- |
| Documents D1, D4 | Category C1 |
| Document D2 | Category C2 |
| Document D3 | Category C3 |

In this specific example, the category manager 210 creates a category C1 for document D1 and D4, classified as being a near duplicate of D1, a category C2 for document D2, and a category C3 for document D3.

In one embodiment, the content excluder 230 may use a common template database 156 to exclude content from classification. That is, the content excluder 230 may identify content in documents to exclude from being evaluated by the document scorer 220 in classifying documents into categories. For example, a copyright notice common to a large group of documents may be excluded form the classifier (and thus the copyright notice does not contribute to a measure of similarity determined between any two documents which include the copyright notice). In other words, the common template database 156 specifies "common content" that the duplicate detector 150 may exclude evaluating when detecting duplicates. That is, the common template database 156 may improve the detection of duplicates by excluding content common to many documents that is not relevant to classifying any particular document as belonging to a particular category.

In one embodiment, the document scorer 220 receives a new document 162. Once received, the document scorer 220 may compute a score 164 for the new document 162 relative to each category 154.

In this specific example, assume the new document 154 is document D5, which is a client letter. Further, suppose that the new document 154 is a duplicate of document D3 of Table I. Suppose that the document scorer 220 calculates similarity scores 164 on a scale from 0 to 100, with a larger number indicating a higher similarity. Table III shows exemplary scores 164 for the new document D5:

TABLE III

Similarity scores example for new document D5

| Category | Score |
| --- | --- |
| Category C1 | 2.5 |
| Category C2 | 1.5 |
| Category C3 | 100.0 |

In this specific example, the document scorer 220 computes a similarity score 164 for the new document 162 with respect to categories C1, C2, and C3, respectively. Specifically, on a similarity scale of 0 to 100, the similarity scores 164 of the new document 162 are 2.5 for category C1, 1.5 for category C2, and 100.0 for category C3. In one embodiment, the document scorer 220 computes each similarity score 164 by evaluating each document using a classifier (e.g., document scorer 220) trained to recognize documents assigned to a given category (i.e., a particular distinct document and any documents identified as being near duplicates of that distinct document). The classifier may be trained using the first document assigned to a category as a positive example of documents represented by that category. Thereafter, classifier may be configured to provide a measure of similarity corresponding to how well a given input document "matches" the category represented by the document used to train the classifier. Further, documents that match the category (above a specified threshold) may be assigned to the category. In such a case, the classifer itself may be trained using the matching document as an additional positive training example. For example, because category C3 represents document D3, the document scorer 220 may compute a similarity score 164 based on documents D5 and D3. For instance, the document scorer 220 may compare (e.g., via a text-based comparison) metadata and/or content of documents D5 and D3. Metadata of a document may include any data associated with a document, such as document title, author, creation date, last modified date, last accessed date, document type, document size, document pathname, document Uniform Resource Indicator (URI), document keywords, etc. The document scorer 220 may also analyze content of documents D5 and D3. For example, the document scorer 220 may evaluate similarity of content (e.g., words) between documents D5 and D3.

In one embodiment, the document scorer 220 evaluates a new document 162 based on the similarity scores (generated earlier by the document scorer 220) of the new document 162. For example, if document D5 has a maximum score for category C3 (i.e., a score of 100 out of a possible 100), the document scorer 220 may identify document D5 as belonging to category C3. In other words, the document scorer 220 may identify document D5 as a duplicate of document D3.

In one embodiment, the threshold manager 240 defines one or more thresholds 158 based on user input. For example, a user may specify a threshold score via the input device 114. The threshold score may also be category-specific. For example, the document scorer 220 may identify document D5 as belonging to category C3 if the similarity score of document D5 with category C3 exceeds a specified threshold score for category C3. Further, a user may define a plurality of thresholds for each category. Each threshold corresponds to a "related document type." Examples of related document types include duplicate documents, near-duplicate documents, similar documents, etc. That is, each related document type reflects a different level of similarity with the category 154. For example, a user may define a first threshold for duplicate documents, a second threshold for "near-duplicate" documents, and a third threshold for "similar" documents. Table VI shows illustrative thresholds 158:

TABLE IV

Threshold example

| Category | Threshold for duplicates | Threshold for near-duplicates |
| --- | --- | --- |
| Category C1 | 80.0 | 76.0 |
| Category C2 | 95.0 | 92.0 |
| Category C3 | 100.0 | 98.0 |

As shown, the thresholds 158 include, for each category, a first threshold for duplicates and a second threshold for near-duplicates. For example, the document scorer 220 may identify a new document 162 as a duplicate belonging to category C1 if the new document 162 exceeds a similarity score of 80.0 for category C1. Further, the document scorer 220 may identify a new document 162 as a near-duplicate belonging to category C1 if the new document 162 exceeds a similarity score of 76.0 but does not exceed 80.0 for category C1. In other words, a user may adjust the thresholds 158 on a per-category basis to increase or decrease scope of a category 166 at a given similarity level.

In one embodiment, the duplicate handler 250 defines one or more duplication rules 160 based on user input. Further, the duplicate handler 250 may perform an action on a new document 162 based on the duplication rules 160. Each duplication rule 160 may include a condition and an action. The condition may involve metadata of a document, categories 154, similarity scores 164, related document types of the document, etc., and any combination thereof. The action may include deleting a document, ignoring a document, marking a document with an associated status (e.g., "duplicate", "near duplicate", "similar", etc.), deprecating a document, notifying a user, creating a new category, etc. For example, duplication rules 160 may include a duplication rule R1 specifying that the duplicate handler 250 is to delete a new document 162 if the new document 162 is a duplicate. Duplication rules 160 may also include a duplication rule R2 specifying that the duplicate handler 250 is to notify a user if the new document 162 is a near duplicate. Further, a duplication rule R3 may specify that the duplicate handler 250 is to deprecate a new document 162 if the new document 162 is a similar document. A duplication rule may also be specific to a category, according to one embodiment. For example, a user may review documents of a given category and further specify what action is to be taken when a near duplicate for the category is detected.

Figure 3:
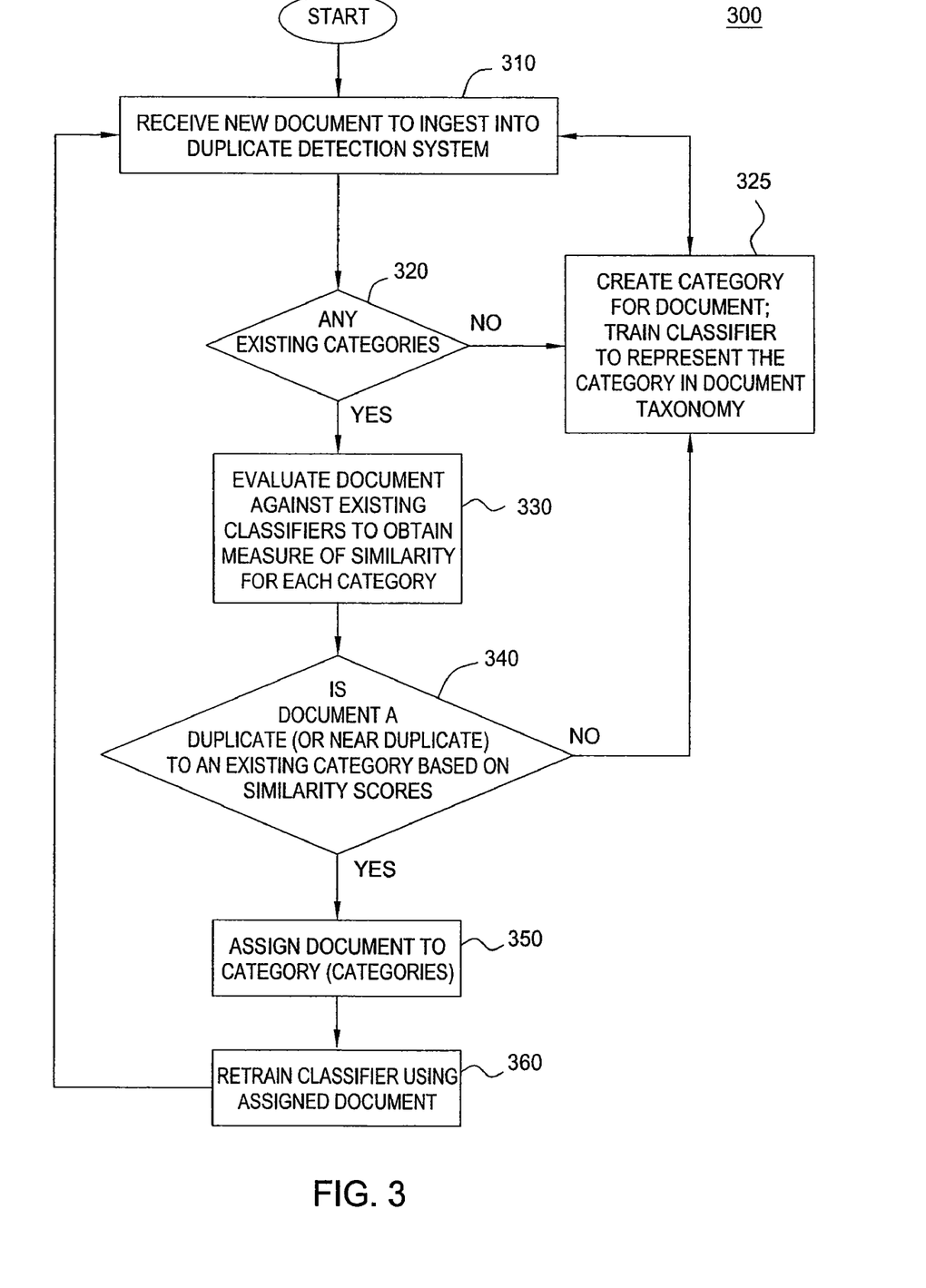
FIG. 3 is a flowchart depicting a method for detecting related documents, according to one embodiment of the invention.

FIG. 3 is a flowchart illustrating a method 300 for detecting related documents, according to one embodiment of the invention. The method 300 may be performed by the duplicate detector 150 of FIG. 1 in conjunction with a statistical classifier that performs the functions of the document scorer 220. As shown, the method 300 begins at step 310, where the duplicate detector 150 receives a new document to ingest into a duplicate detection system. At step 320, the duplicate detector 150 determines whether any categories exist. If not, the method 300 proceeds to step 325, where the duplicate detector 150 creates a category for the new document and trains a statistical classifier using the new document as a positive training example for the created category.

If one or more existing categories is found at step 320, the method 300 proceeds to step 330, where the statistical classifier evaluates the new document against the existing categories to compute measures of similarity for each existing category. The duplicate detector 150 may then receive the measures of similarity from the statistical classifier. At step 340, the duplicate detector 150 determines whether the new document is related to an existing category, based on the measures of similarity. If not, the method 300 returns to step 325, where the duplicate detector 150 creates a new category for the new document and trains a statistical classifier with the new document and created category.

If the new document is determined to be related to an existing category at step 340, the duplicate detector 150 assigns the new document to the related category (step 350) and trains the classifier using the assigned document as an additional positive training example (step 360). In one embodiment, the duplicate detector 150 may also perform different actions for different degrees of similarity (such as duplicate, near duplicate, similar, etc.) based on duplication rules 160, which may be defined by a user.

Figure 4:
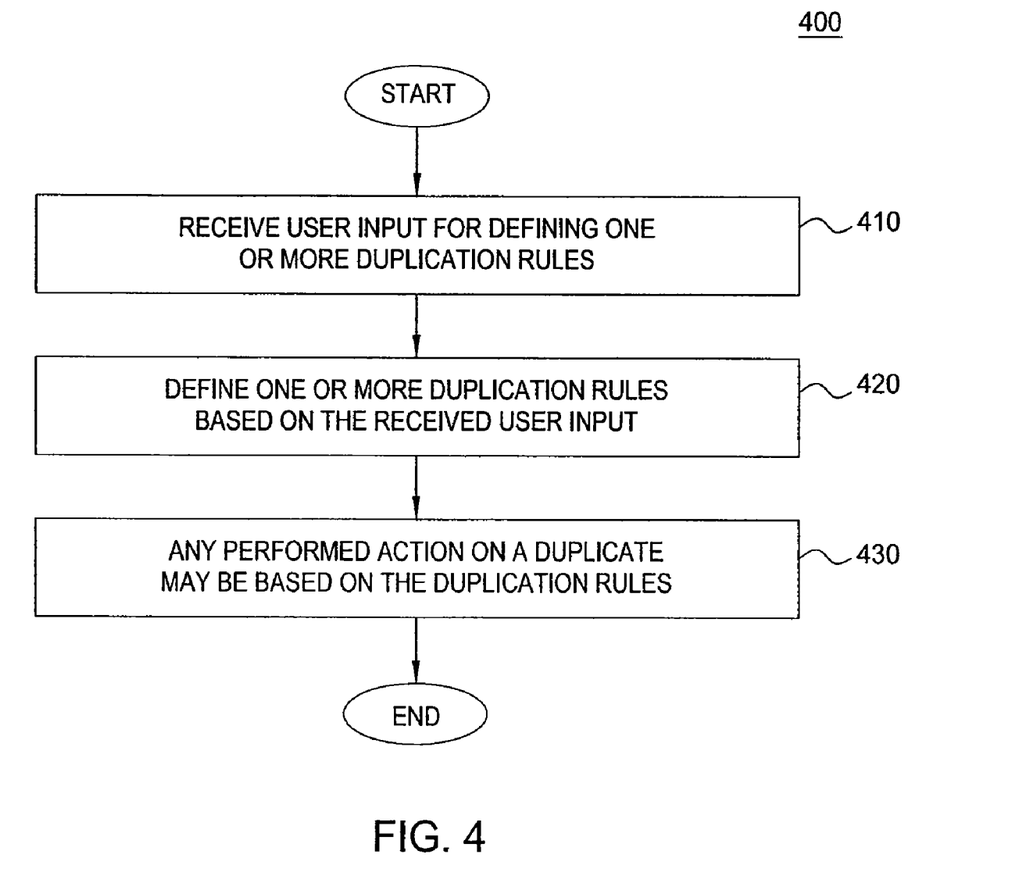
FIG. 4 is a flowchart depicting a method for defining duplication rules, according to one embodiment of the invention.

FIG. 4 is a flowchart depicting a method 400 for defining duplication rules, according to one embodiment of the invention. The method 400 may be performed by the duplicate handler 250 of FIG. 2. As shown, the method 400 begins at step 410, where the duplicate handler 250 receives user input for defining one or more duplication rules 160. At step 420, the duplicate handler 250 defines one or more duplication rules 160 based on the received user input. For example, a duplication rule may be defined to mark near duplicate documents as "near duplicates".

At step 430, the duplicate handler 250 may perform an action on a new document 162 based on the duplication rules 160. For example, the duplicate handler 250 may delete a duplicate document, ignore a duplicate document, or deprecate a duplicate document. After step 430, the method 400 terminates.

Figure 5:
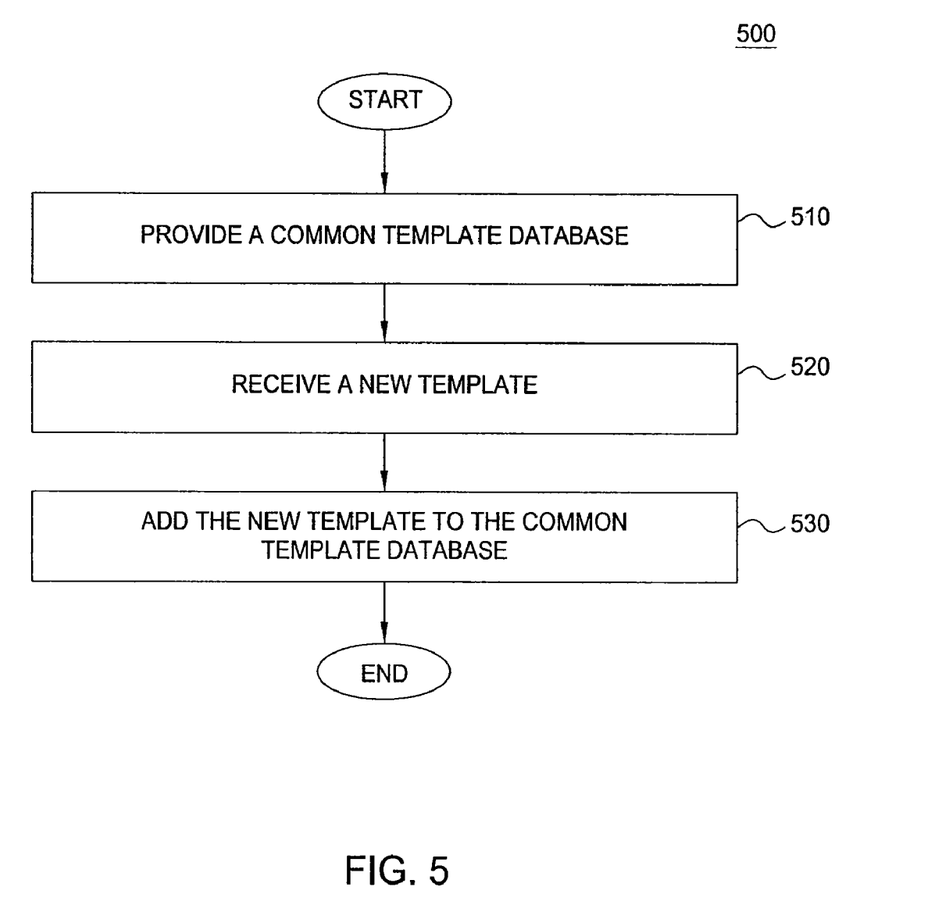
FIG. 5 is a flowchart depicting a method for detecting a duplicate document using a common template database, according to one embodiment of the invention.

FIG. 5 is a flowchart depicting a method 500 for detecting a duplicate document using a common template database 156, according to one embodiment of the invention. The method 500 may be performed by the document scorer 220 of FIG. 2. The steps of the method 500 are described in conjunction with the template example of Table III.

As shown, the method 500 begins at step 510, where the content excluder 230 provides a common template database 156. For example, the content excluder may provide an empty common template database 156 (i.e., one that does not yet include any templates). At step 520, the document scorer 220 may receive a new template. For example, the document scorer 220 may receive, from a user, the template of Table III.

At step 530, the document scorer 220 adds the new template to the common template database 156. For example, the document scorer 220 may add the template of Table III to the common template database 156. After step 530, the method 500 terminates.

Figure 6:
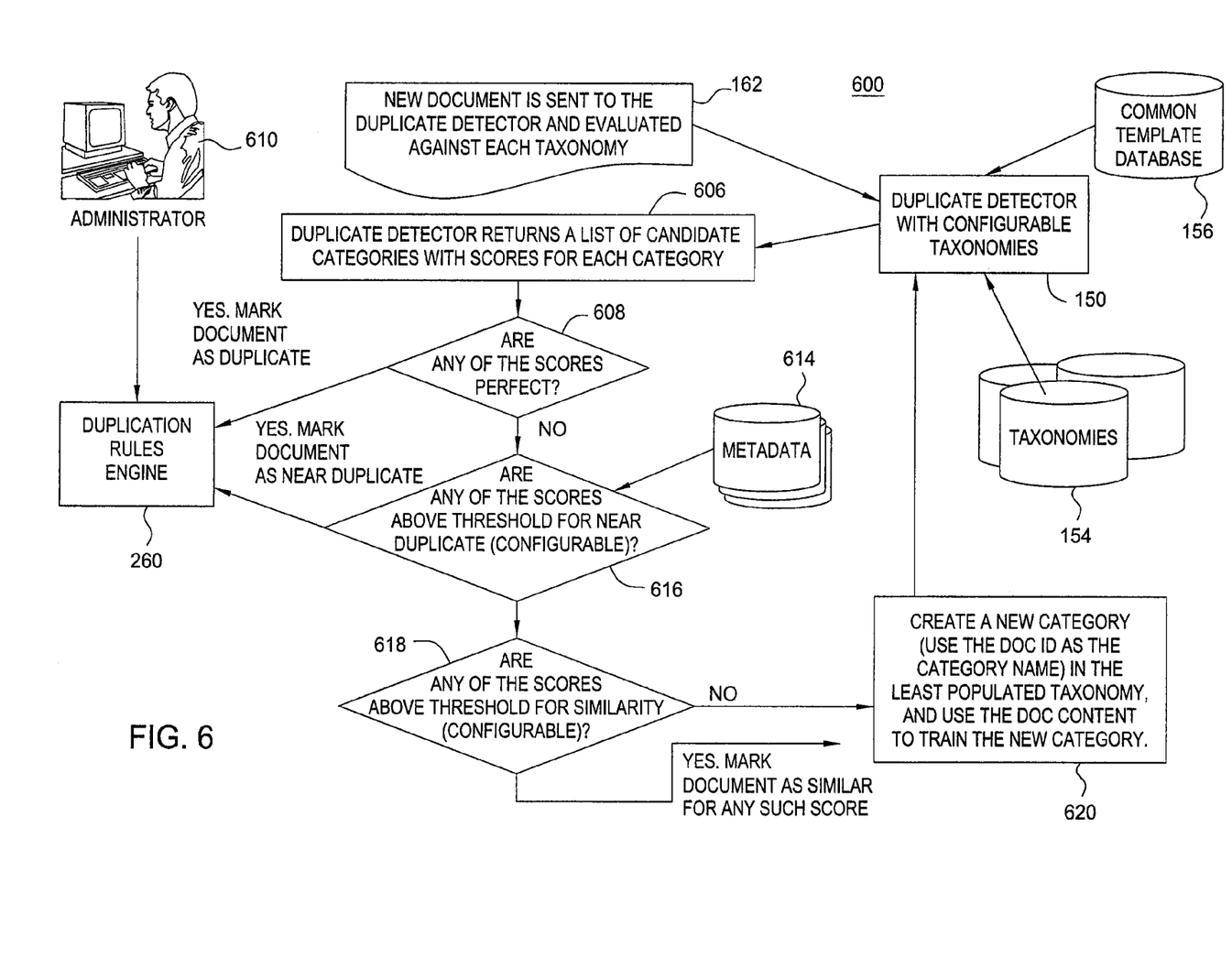
FIG. 6 is a data flow diagram illustrating a method for detecting related documents, according to one embodiment of the invention.

FIG. 6 is a data flow diagram 600 for detecting related documents, according to one embodiment of the invention. As shown, the data flow diagram 600 includes the duplicate detector 150. The duplicate detector 150 is also referred to herein as "classification software." The duplicate detector 150 may provide categories 154 that are organized into one or more taxonomies. As shown, the duplicate detector 220 receives the new document 162 and evaluates the new document 162 against each taxonomy. Further, the duplicate detector 150 may exclude evaluating content matching a template in the common template database 156. At step 606, the duplicate detector 150 returns a list of candidate categories 154 with scores 164 for each category 154.

At step 608, the duplicate detector 150 determines whether any of the scores 164 are "perfect" (i.e., whether the score between a given document and category are the maximum possible scores, indicating that the new document is an exact duplicate of an existing document). If so, the duplicate detector 150 marks the new document 162 as a duplicate and transfers control to the duplication rules engine (i.e., the duplicate handler 250). The duplication rules engine includes one or more duplication rules 160 based on input from a user, such as an administrator 610.

If none of the scores 164 are perfect, the duplicate detector 150 proceeds to step 616, where the duplicate detector 150 determines whether any of the scores 164 are above a threshold 158 for a near duplicate document. Each threshold 158 may be configurable based on metadata 614 that describes the new document and/or describes documents associated with a category 154.

If the duplicate detector 150 determines that a score 164 exceeds a threshold 158 for a near duplicate document, the duplicate detector 150 marks the new document 162 as a near duplicate document and transfers control to the duplication rules engine. Otherwise, the duplicate detector 150 proceeds to step 618, where the duplicate detector 150 determines whether any of the scores 164 are above a threshold 158 for similarity. If so, the duplicate detector 150 merely marks the new document 162 as a similar document.

After step 618, the duplicate detector 150 proceeds to step 620, where the duplicate detector 150 creates a new category in a least populated taxonomy (a content classifier may provide a plurality of taxonomies to improve performance in classifying content). In one embodiment, the duplicate detector 150 may create a new category upon determining that the new document 162 is not a duplicate (or near duplicate) of any currently classified document. The new category may be named after an identifier of the document. The duplicate detector 150 may also train the new category using content of the new document 162. For example, the duplicate detector 150 may associate the new category with content of the new document that does not match any template in the common template database 156. Once the new category is trained, the duplicate detector 150 may receive another new document 162 for classification.

Of course, the embodiments described herein are intended to be illustrative and not limiting of the invention, and other embodiments are broadly contemplated. Those skilled in the art will recognize, for example, that embodiments of the invention may be adapted to support various ways of computing similarity scores, of defining thresholds, and of defining duplication rules.

Advantageously, embodiments of the invention detect duplicate, and importantly, near duplicate documents in large document collections. In one embodiment, a duplicate detector may provide a plurality of documents. The duplicate detector may classify the plurality of documents into a plurality of categories, each category of the plurality of categories corresponding to a distinct document of the plurality of documents. Further, the duplicate detector may receive a new document. Further still, the duplicate detector may evaluate the new document against each category of the plurality of categories to compute a plurality of similarity scores for the new document, the similarity scores including a similarity score with respect to each respective category. Still further, the duplicate detector may identify, based on the plurality of similarity scores and based on thresholds for each category, the new document as a related document to a category of the plurality of categories. Moreover, the duplicate detector may perform an action on the related document based on duplication rules. A user may customize the thresholds and the duplication rules. The duplicate detector may also identify near-duplicate documents and similar documents.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing a collection of documents, comprising:
   determining, by operation of one or more computer processors, a similarity score between a received document and each of a plurality of categories, wherein each category is assigned one or more documents, and wherein each category is associated with a first similarity threshold for determining duplicates and a second similarity threshold for determining near-duplicates, wherein the similarity thresholds for each category are specified by one or more duplication rules associated with the respective category, and wherein the one or more duplication rules for each category further specify, for the respective category, a first action to be performed on a duplicate and a second, different action to be performed on a near-duplicate;

determining, based on the plurality of similarity scores and the similarity thresholds, whether the received document is one of a duplicate and a near-duplicate of one of the documents assigned to one of the plurality of categories;

upon determining that the received document is not a duplicate and not a near duplicate of a document assigned to any of the plurality of categories:
    training a classifier associated with a new category using the received document, wherein the trained classifier is configured to determine a measure of similarity between the received document and an input document; and upon determining that the received document is a duplicate or near duplicate of a document assigned to at least one of the plurality of categories:
    assigning the document to the determined category, and
    training a classifier associated with the determined category using the received document.

2. The computer-implemented method of claim 1, wherein determining the similarity score between the received document and each respective category comprises supplying the received document as input to a classifier associated with each respective category, wherein each classifier is configured to generate the measure of similarity between the received document and the documents assigned to a respective category.

3. The computer-implemented method of claim 2, wherein the documents assigned to each respective category are duplicates, or near duplicates, of one another.

4. The computer-implemented method of claim 1, wherein the operation further comprises, upon determining that the received document is not a duplicate, or near duplicate, to a document assigned to any of the plurality of categories, assigning the received document to the new category.

5. The computer-implemented method of claim 1, wherein determining, based on the plurality of similarity scores, whether the received document is a near-duplicate of one of the documents assigned to one of the plurality of categories comprises whether the similarity score exceeds the second similarity threshold.

6. The computer-implemented method of claim 1, wherein the operation further comprises excluding, based on a common template, at least some content in the received document from the determination of the similarity score between the received document and each of the plurality of categories.

7. The computer-implemented method of claim 1, wherein the operation further comprises, upon determining that the received document is a duplicate, or near duplicate, to a document assigned to at least one of the plurality of categories, performing a user-specified action selected from at least one of, deprecating the duplicate, or near duplicate document, removing the received document from the collection of documents, removing at least the duplicate, or near duplicate document from the collection of documents, and notifying a user that the received document is a duplicate, or near duplicate, of at least one document in the collection of documents, wherein the first similarity threshold for each category is different from the second similarity threshold for the respective category, wherein the first similarity threshold for at least a first category is different from the first similarity threshold for at least a second category.

8. A computer program product, the computer program product comprising a computer usable storage medium having computer usable program code for managing a collection of documents, the code being configured for:
    determining, by operation of one or more computer processors when executing the computer usable program code, a similarity score between a received document and each of a plurality of categories, wherein each category is assigned one or more documents, and wherein each category is associated with a first similarity threshold for determining duplicates and a second similarity threshold for determining near-duplicates, wherein the similarity thresholds for each category are specified by one or more duplication rules associated with the respective category, and wherein the one or more duplication rules for each category further specify, for the respective category, a first action to be performed on a duplicate and a second, different action to be performed on a near-duplicate;
    determining, based on the plurality of similarity scores and the similarity thresholds, whether the received document is one of a duplicate and a near-duplicate of one of the documents assigned to one of the plurality of categories;
    upon determining that the received document is not a duplicate and not a near duplicate of a document assigned to any of the plurality of categories:
        training a classifier associated with a new category using the received document, wherein the trained classifier is configured to determine a measure of similarity between the received document and an input document; and
    upon determining that the received document is a duplicate or near duplicate of a document assigned to at least one of the plurality of categories:
        assigning the document to the determined category, and
        training a classifier associated with the determined category using the received document.

9. The computer program product of claim 8, wherein determining the similarity score between the received document and each respective category comprises supplying the received document as input to a classifier associated with each respective category, wherein each classifier is configured to generate the measure of similarity between the received document and the documents assigned to a respective category.

10. The computer program product of claim 9, wherein the documents assigned to each respective category are duplicates, or near duplicates, of one another.

11. The computer program product of claim 8, wherein the code is further configured for, upon determining that the received document is not a duplicate, or near duplicate, to a document assigned to any of the plurality of categories, assigning the received document to the new category.

12. The computer program product of claim 8, wherein determining, based on the plurality of similarity scores, whether the received document is a near-duplicate of one of the documents assigned to one of the plurality of categories comprises whether the similarity score exceeds the second similarity threshold.

13. The computer program product of claim 8, wherein the code is further configured for excluding, based on a common template, at least some content in the received document from the determination of the similarity score between the received document and each of the plurality of categories.

14. The computer program product of claim 8, wherein the code is further configured for, upon determining that the received document is a duplicate, or near duplicate, to a document assigned to at least one of the plurality of categories, performing a user-specified action selected from at least one of, deprecating the duplicate, or near duplicate document, removing the received document from the collection of documents, removing at least the duplicate, or near duplicate document from the collection of documents, and notifying a user that the received document is a duplicate, or near duplicate, of at least one document in the collection of documents, wherein the first similarity threshold for each category is different from the second similarity threshold for the respective category, wherein the first similarity threshold for at least a first category is different from the first similarity threshold for at least a second category.

15. A system, comprising:
a processor; and
a memory containing an application program configured to manage a collection of documents, which, when executed on the processor is configured to perform an operation comprising:
determining a similarity score between a received document and each of a plurality of categories, wherein each category is assigned one or more documents, and wherein each category is associated with a first similarity threshold for determining duplicates and a second similarity threshold for determining near-duplicates, wherein the similarity thresholds for each category are specified by one or more duplication rules associated with the respective category, and wherein the one or more duplication rules for each category further specify, for the respective category, a first action to be performed on a duplicate and a second, different action to be performed on a near-duplicate;
determining, based on the plurality of similarity scores and the similarity thresholds, whether the received document is one of a duplicate and a near-duplicate of one of the documents assigned to one of the plurality of categories;
upon determining that the received document is not a duplicate and not a near duplicate of a document assigned to any of the plurality of categories:
training a classifier associated with a new category using the received document, wherein the trained classifier is configured to determine a measure of similarity between the received document and an input document; and
upon determining that the received document is a duplicate or near duplicate of a document assigned to at least one of the plurality of categories:
assigning the document to the determined category; and
training a classifier associated with the determined category using the received document.

16. The system of claim 15, wherein determining the similarity score between the received document and each respective category comprises supplying the received document as input to a classifier associated with each respective category, wherein each classifier is configured to generate the measure of similarity between the received document and the documents assigned to a respective category.

17. The system of claim 15, wherein the documents assigned to each respective category are duplicates, or near duplicates, of one another.

18. The system of claim 15, wherein the operation further comprises, upon determining that the received document is not a duplicate, or near duplicate, to a document assigned to any of the plurality of categories, assigning the received document to the new category.

19. The system of claim 15, wherein determining, based on the plurality of similarity scores, whether the received document is a near-duplicate of one of the documents assigned to one of the plurality of categories comprises whether the similarity score exceeds the second similarity threshold.

20. The system of claim 15, wherein the operation further comprises excluding, based on a common template, at least some content in the received document from the determination of the similarity score between the received document and each of the plurality of categories.

21. The system of claim 15, wherein the operation further comprises, upon determining that the received document is a duplicate, or near duplicate, to a document assigned to at least one of the plurality of categories, performing a user-specified action selected from at least one of, deprecating the duplicate, or near duplicate document, removing the received document from the collection of documents, removing at least the duplicate, or near duplicate document from the collection of documents, and notifying a user that the received document is a duplicate, or near duplicate, of at least one document in the collection of documents, wherein the first similarity threshold for each category is different from the second similarity threshold for the respective category, wherein the first similarity threshold for at least a first category is different from the first similarity threshold for at least a second category.

* * * * *